3,136,743
PROCESS FOR PREPARING LUBRICANT AND DISTILLATE FUEL ADDITIVES
Walter D. Conway, Chevy Chase, Md., and Gerald K. Vick, Plainfield, Hugh H. Horowitz, Elizabeth, and William C. Hollyday, Jr., Plainfield, N.J., assignors to Esso Research and Engineering Company, a corporation of Delaware
Filed Dec. 30, 1959, Ser. No. 862,891
6 Claims. (Cl. 260—78.5)

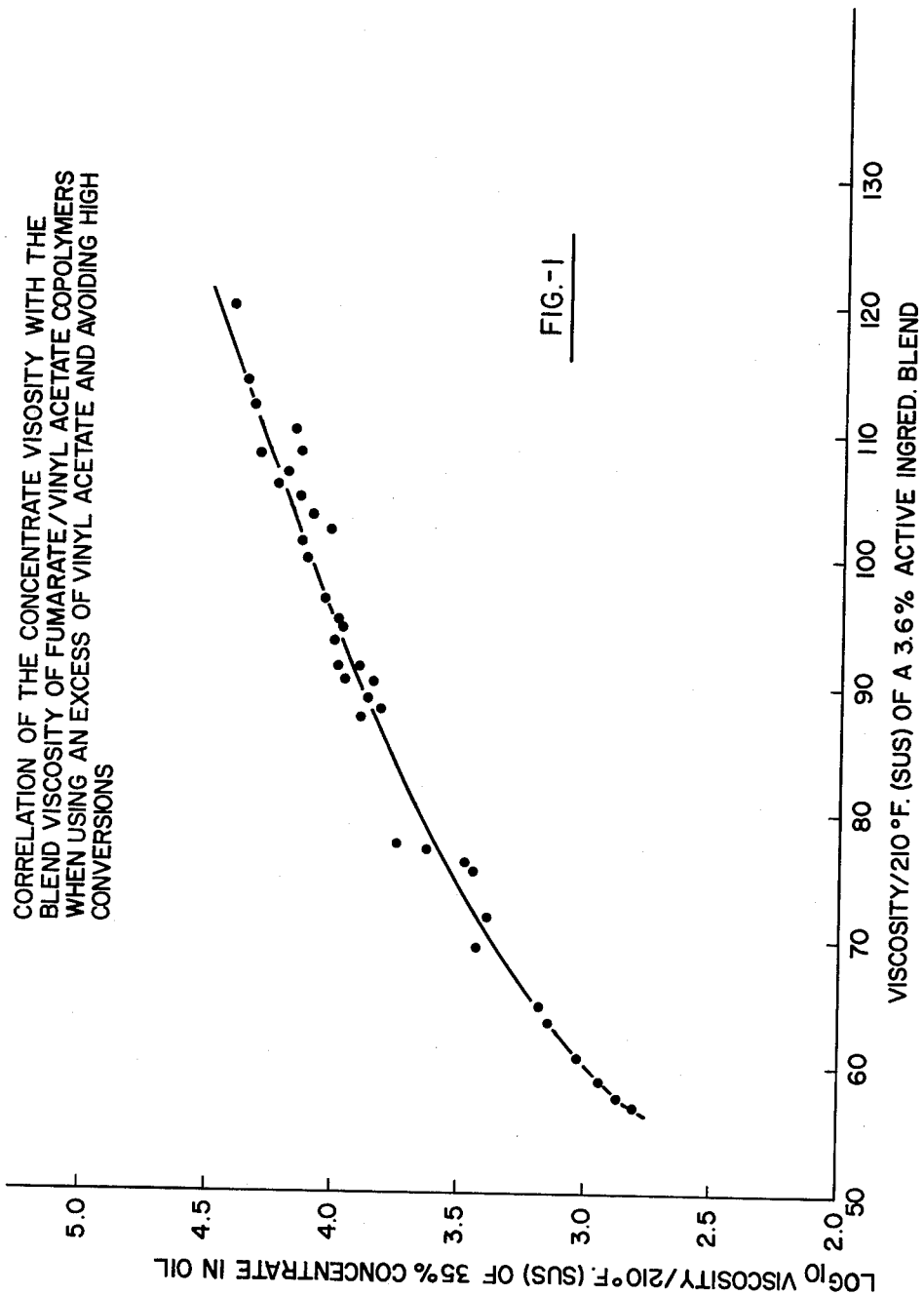

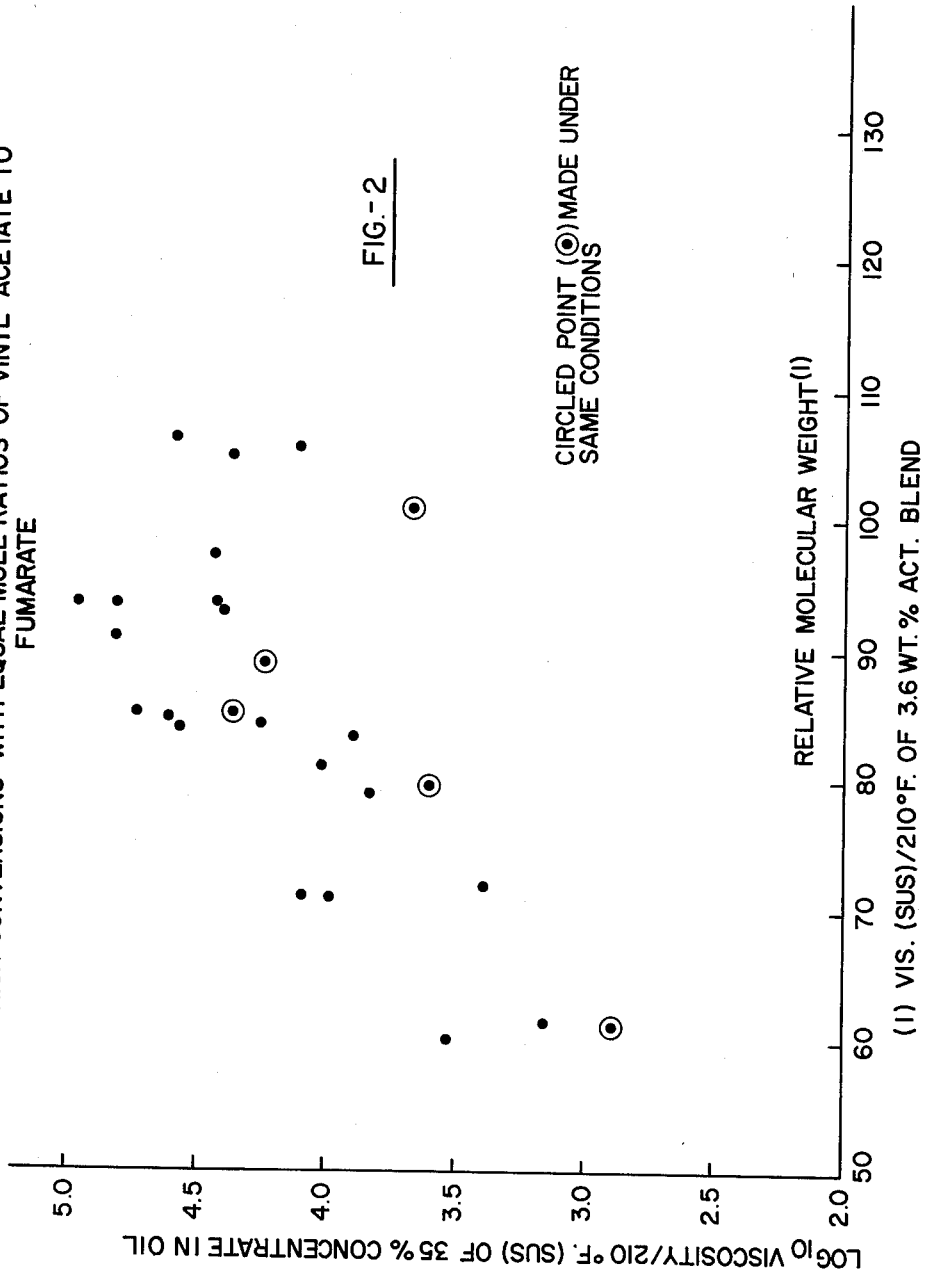

This invention relates to a new and improved process for the preparation of high molecular weight copolymers of two or more monomers, one being an ester of fumaric acid and the other being a vinyl ester. More particularly, the present invention relates to an improved process for preparing copolymeric additives by copolymerizing a vinyl ester with a fumaric acid ester, or with a mixture of fumaric acid ester and maleic anhydride, wherein high molar ratios of vinyl ester to fumaric acid ester are used and the copolymerization is continued until substantially complete conversion of the fumaric acid ester is obtained.

The copolymers prepared by the process of this invention are especially useful as dispersants in lubricants and distillate fuels, and as pour point and viscosity index improvers in mineral lubricating oils.

It has heretofore been suggested to copolymerize fumaric acid esters, i.e. fumarate esters, with the vinyl ester of a fatty acid. The prior art processes by which these fumarate-vinyl ester copolymeric additives have been prepared, however, have the disadvantage of giving copolymers of varying effectiveness as additives for lubricating oils and distillate fuels. The improved process of this invention affords a means for preparing copolymeric additives having uniformly high potency as viscosity index improvers and pour point depressants, as well as relatively low concentrate viscosities.

It is essential, in the process of this invention, that at least 1.5 moles, and preferably 2 to 5 moles of vinyl ester per mole of fumarate ester are employed and that the polymerization be stopped upon substantially complete conversion of the fumarate ester (that is, stopped upon conversion of 96.0 to 99.9% of the fumarate) thereby leaving an excess of unconverted vinyl acetate. If less than about 1.5 moles of vinyl ester per mole of fumarate ester are copolymerized until substantially complete conversion of the ester fumarate takes place, a copolymer of relatively low molecular weight and low potency for improving viscosity index is obtained. This same reaction, in the same mole ratios, may be carried beyond the full conversion of the fumarate ester to increase the molecular weight and the potency of the resulting copolymer for improving viscosity index by grafting and cross-linking reactions, but then the product will be variable and unpredictable in its molecular weight, in the viscosity of its oil concentrates, and in its resistance to shear degradation. Conversely, if 1.5 to 5 or more moles of vinyl ester per mole of ester fumarate are used, but the reaction is continued past the point of substantially complete conversion of the fumarate ester, a copolymeric product of decreased solubility in oil will normally be formed, especially where the fumarate ester being used is a relatively low molecular weight dialkyl fumarate averaging 375 to 400 in molecular weight.

Other advantages have also been found to be inherent in the improved process of this invention. For example, the use of high mole ratios of vinyl ester to fumarate ester reduces the reaction time which normally would be required to attain products of equally high molecular weight using the low mole ratios of vinyl ester to fumarate ester as described in the prior art. Also, stopping the polymerization upon substantially complete conversion of the fumarate ester decreases the viscosity of the resulting additives in mineral oil solutions, and thus facilitates the preparation of concentrate mineral oil solutions. Another advantage of the process of this invention is the fact that the use of excess vinyl ester makes possible the use of a polarograph to determine the end point of the polymerization.

The alcohols which are reacted with fumaric acid to form the fumarate ester will contain 8 to 18 carbon atoms and include such alcohols as $C_{10}$ (decyl), $C_{12}$ (lauryl) and $C_{14}$ (tetradecyl) alcohol. A mixture of two or more alcohols having an average number of carbon atoms ranging from about 8 to 18, and preferably averaging about 10 to 14 carbon atoms, may also be employed in forming the fumarate ester. One very suitable commercially available mixed alcohol is a product obtained by hydrogenation of tallow. Such alcohols generally contain up to about 98% or more of mixed hexadecyl and octadecyl alcohols, and about 2% or less of tetradecyl alcohol. Mixed alcohols obtained by hydrogenation of coconut oil (averaging from about $C_{12}$ to about $C_{14}$) may also be used.

Other alcohols which may be used include octyl, decyl, cetyl, octadecyl, as well as a mixture of octyl or decyl with cetyl or octadecyl, and a mixture of $C_8$, $C_{10}$, $C_{12}$, $C_{14}$, $C_{16}$, and $C_{18}$ alcohols having an average in the $C_{11}$–$C_{14}$ range. Even some of the alcohols having less than 8 carbon atoms, e.g. hexyl, amyl, or even lower may be used, providing that a sufficient amount of higher alcohols, having for instance 12 to 18 carbon atoms, are also used to make a total mixed alcohol product averaging at least as high as 8 carbon atoms and preferably averaging about 10 to 14 carbon atoms. When the alcohols in the fumarate ester average above about $C_{12}$, for example about $C_{13.5}$, the copolymers are exceptionally active as pour depressants as well as V.I. improvers. Shorter alcohols, for example decyl and octyl, in the fumarate ester give fumarate-vinyl copolymers which are exceptional V.I. improvers, but which have little or no pour depressant action unless some higher alcohols such as hexadecyl or octadecyl are also present.

In preparing the fumaric acid ester, which may also be called a dialkyl fumarate, direct esterification of fumaric acid with an alcohol is preferred. However, ester interchange between a lower alkyl fumarate such as methyl or ethyl or amyl fumarate, and a higher alcohol of the desired type, e.g., one having 8 to 18 carbon atoms or so, such as tetradecyl, may also be employed. The ester interchange may be carried substantially to completion, or only partly so. In the latter case, the product will contain mixed esters such as methyl tetradecyl fumarate.

It should also be understood that the dialkyl fumarates useful in the process of this invention may be mixtures of dialkyl fumarates prepared from single alcohols and fumaric acid, or mixtures of said single alcohol dialkyl fumarates with dialkyl fumarates prepared by esterification of mixed alcohols with fumaric acid. For example, a particularly preferred dialkyl fumarate mixture for the process of this invention is one which consists of tallow fumarate (the esterification product of a mixture of tallow alcohols with fumaric acid), $C_8$ Oxo fumarate, and $C_{13}$ Oxo fumarate. The dialkyl fumarate esters used in the process of this invention will preferably have an average molecular weight of about 375 to about 510 regardless of whether prepared from single alcohols or commercial mixtures of alcohol.

The other primary reactant to be copolymerized with the above described dialkyl fumarate esters, is the vinyl ester of a lower fatty acid, preferably having in the range of 2 to 18 carbon atoms. Vinyl acetate is the preferred vinyl ester, although one may also use vinyl esters of other acids such as propionic, butyric, lauric, myristic, palmitic, etc., for example the vinyl ester of coconut oil acids.

The mole ratio of vinyl ester to fumarate ester will be at least 1.5 and preferably will range from about 2 to 5 moles of vinyl ester per mole of fumarate ester.

As previously state, the new and improved process of this invention is also applicable to the preparation of copolymeric additives containing more than two monomers, i.e., other monomers in addition to the vinyl ester and dialkyl fumarate esters disclosed above. In this respect, the present invention has been found to be of particular utility in the prepaartion of improved polymeric additives from vinyl esters, dialkyl fumarates and maleic anhydride. In forming the terpolymers by the process of this invention, only minor amounts of the third monomer will be employed. The maleic anhydride, for example, will comprise about 1.0 to 5.0 wt. percent and preferably 1.5 to 3.5 wt. percent of the total reactants (including the excess vinyl ester). Other monomers which may be added to the vinyl ester and dialkyl fumarate mixture, in amounts ranging from 0.1 to 10.0 wt. percent, are N-vinyl pyrrolidone, alkenes, and ether and hydroxy substituted alkenes.

In carrying out the copolymerization, the two or more reactants may be mixed and the mixture heated with or without a solvent or diluent, and preferably with a small amount of peroxide catalyst, to a reaction temperature of about 50 to 125° C., preferably about 60 to 80°, using, if necessary, eitiher superatmospheric pressure or refluxing, to prevent loss of reactants by vaporization. Adequate cooling should be provided to absorb the heat of polymerization. It is often convenient, especially when employing large proportions of vinyl ester, to add the latter gradually rather than all at once, thus controlling the polymerization rate. As catalyst, it is found suitable to use about 0.1 to 5.0 wt. percent, for example, 1.0% by weight of a peroxide such as benzoyl peroxide, acetyl peroxide, t-butyl hydroperoxide, t-butyl perbenzoate or azobis isobutyronitrile, etc.

The reaction time will vary, for instance, from about 3 to 12 hours, preferably about 4 to 6 hours, the reaction time varying inversely with the temperature. The molecular weight as determined by light scattering should be from about 50,000 to 2,000,000, but preferably from about 200,000 to 1,000,000 for best results from a pour depressing point of view. When employed as viscosity index improvers, copolymer molecular weights from about 400,000 to 800,000 are preferred. A solvent or diluent, such as n-heptane or other inert liquid such as petroleum ether, refined naphtha, kerosene, lubricating oil, etc., may be used.

If reproducible relatively high molecular weights and relatively low viscosities are to be obtained the copolymerization must be terminated at a consistent point, that is at about 96.0 to 99.9% conversion of the fumarate ester. In order to observe this degre of fumarate conversion, a polarograph can be used. To use this instrument, however, an excess of vinyl ester must be used during the reaction and removed thereafter. With low mole ratios of vinyl esters to fumarate ester, the desired molecular weight range is reached long after 100% conversion of the fumarate ester and polarographic analysis is useless. Use of excess vinyl ester, therefore, not only gives copolymers of uniformly high viscosity index improving potency and reproducibly low viscosity in concentrated oil solutions, but also facilitates the use of a polarograph to determine the end point of the reaction.

Polarographic analysis, in general, depends upon the fact that certain compounds can be oxidized at an electrode. The potential at which this oxidation starts to occur is relatively specific for a given oxidizable compound. Therefore, if the potential is raised above a certain lower limit, the current transmitted through the electrolyte varies with the applied potential, and is proportional to the amount of oxidizable material present. The specific analysis, in our case, for unreacted fumarate ester in the presence of vinyl ester is possible because the fumarate ester is oxidized at a lower potential than the vinyl ester.

Since the current is proportional to the amount of oxidizable material present (fumarate ester) at any given potential, unknown amounts of fumarate ester can be determined by comparison with known compositions. Ordinarily, the analysis is run by varying the potential steadily with time, then comparing the plots of current vs. potential for the known and unknown. If the curve reaches a point twice as high with the unknown as it did with the known, the unknown compositions contain twice as much unreacted fumarate ester.

In order to present a clean surface to the electrolyte (free of precipitated materials), a dropping mercury electrode is used. As the mercury droplets form, they continuously present a clean surface to the electrolyte.

Other means which may be used to determine the percent conversion of fumarate monomer include precipitation of the polymer by adding a non-solvent, analyzing the precipitated polymer for total ester groups, then hydrolyzing and removing and analyzing in the volatile acetic acid (where vinyl acetate is used). The non-precipitated fumarate monomer could also be determined by removing the volatile vinyl acetate, when used as the vinyl ester, provided the fumarate monomer were non-volatile, which is normally the case. These other means are less convenient than polarography and take longer.

During the copolymerization it is preferred to exclude oxygen or air by any suitable means such as by blowing the reaction mixture or the reaction vessel with an inert gas such as nitrogen or carbon dioxide.

The copolymers of this invention may be used as lubricating oil additives in concentrations ranging, for instance, from about .05% to 5%, or more. Preferably, from about 0.1% to 0.5% is used when pour depressing is the primary object, and a larger concentration, for example, from 0.5% to 10% when V.I. improvement is the primary object. The coil base stocks in which the copolymers may be used include the paraffinic oils which require pour depressors, the naphthenic or mixed base lubricating oils which are to be improved in viscosity index, or blends of various types of oils where substantial improvements in both pour depressing and V.I. improvement are desired. The copolymers may also be used in greases which contain metal soaps, or in paraffin wax or waxy compositions, or in lighter liquid hydrocarbon oil products such as diesel fuel base stocks, which are often highly paraffinic in nature and require pour depressing, or in light oils such as domestic heating oil base stocks, mineral seal oil, refined kerosene and the like.

In preparing the lubricating oil or other compositions containing the novel copolymers of this invention, one may also add conventional additives such as dyes, antioxidants, etc., or one may add different types of pour depressors such as the wax-naphthalene condensation product previously referred to or a wax-phenol condensation product, and viscosity index improvers such as polybutene, polyacrylates, e.g. poly lauryl methacrylate, polyvinyl ethers, polyvinyl esters, etc.

The invention will be better understood from a consideration of the following examples.

EXAMPLE I

As an example of the improved fumarate-vinyl ester copolymeric additives prepared by the process of this invention, a mixture of di $C_8$ Oxo fumarate and di tallow fumarate having an average mol. wt. of 377 was prepared by separate, direct, esterification of fumaric acid with, in one case $C_8$ Oxo alcohol, in the other case alcohols obtained by the hydrogenation of tallow. These tallow alcohols contained about 1.5 wt. percent tetradecyl alcohol, 34 wt. percent hexadecyl alcohol and 64.5 wt. percent octadecyl alcohol and had an average molecular weight of about 265. The resulting dialkyl fumarate ester mixture was copolymerized with vinyl acetate in the presence of excess vinyl acetate, with small amounts of hexane added in the later stages of the polymerization to control viscosity. A minor amount of benzoyl peroxide was used as the catalyst. The exact amounts of the materials used were as follows:

34 g. di tallow fumarate
120 g. di $C_8$ Oxo fumarate
104.5 g. vinyl acetate
150 cc. hexane (the solvent was added incrementally)
1.3 g. 60 mesh benzoyl peroxide The above charge was stirred for 6 hours ten minutes at about 60 C. under a nitrogen atmosphere. The percent conversion of the dialkyl fumarate mixture was determined during the reaction by means of a polarograph. Upon conversion of approximately 99 wt. percent of the fumarate monomer, the reaction was terminated by the addition of 10 g. of a sulfurized terpene (Santolube 394C) as a chain-stopping agent. (In some other runs hydroquinone was used as the chain-stopping agent. Use of such agents to end polymerizations are well known to those skilled in the art.) The hexane and unreacted vinyl acetate were then removed by blowing with nitrogen at about 80° C.

The resulting copolymeric product was blended with a mineral lubricating oil having a viscosity at 100° F. of 150 S.S.U. and a viscosity index of 108 to form a concentrate solution containing 35% by weight of the copolymer.

The copolymer prepared by the above procedure had a low and reproducible concentrate viscosity, a high thickening power in dilute solution and a high viscosity index ceiling. To illustrate the fact that copolymers having the above desirable properties are readily reproducible by means of the process of this invention, four more samples of the above type of vinyl acetate-fumarate copolymer were prepared according to the same procedure. Table I illustrates the physical properties of both concentrate and dilute mineral oil solutions of these copolymer samples.

Table I

VINYL ACETATE-FUMARATE COPOLYMERS PREPARED WITH 2.9/1 MOLE RATIO OF VINYL ACETATE/FUMARATE AND ABOUT 99% CONVERSION OF FUMARATE

| Copolymer | Relative mol. wt.[1] | Vis/210 (SUS) of 35% concentrate [2] | V.I. of 3.6% blend | Wt. percent of monomer mixture converted to polymer[3] | Percent breakdown in gear pump test [4] |
|---|---|---|---|---|---|
| Vinyl acetate-dialkyl* fumarate | 108.5 | 12,400 | 151 | 69 | 48.5 |
| Do | 104.7 | 13,675 | 150 | 71 | 48.5 |
| Do | 102.1 | 12,700 | 151 | 72 | 49 |
| Do | 109.5 | | 148 | 74 | 50 |
| Do | 90.4 | 6,900 | 148 | 72 | 39 |

*$C_8$ Oxo and ditallow fumarates mixed, the mixture having an average weight of about 380 (molecular).
[1] Relative molecular weight is the viscosity at 210° F. (SUS) of a refined Mid-Continent mineral lubricating oil having a viscosity at 210° F. of 45.7 SUS, and a V.I. of about 113, containing 3.6 percent by weight of the copolymer.
[2] 35% by weight of the copolymer in a mineral lubricating oil having a viscosity at 100° F. of 150 SUS and a V.I. of 108.
[3] Conversion of 72-74 weight percent of the monomer mixture represents 99+% conversion of the fumarate.
[4] Sample of polymer in standard test oil is circulated under pressure through a close-tolerance gear pump under controlled conditions (time, pressure, temperature). The viscosity is determined before and after circulation through the gear pump. From the change in viscosity percent breakdown is calculated.

The foregoing table illustrates the relatively low concentrate viscosity of mineral oil blends as compared with the viscosity and viscosity index of dilute mineral oil blends of the same copolymer.

As a comparison, two samples of a fumarate ester vinyl ester copolymer were prepared using 1.34 molar proportions of vinyl acetate per molar proportion of fumarate ester. The copolymerization of the first sample was carried to 100% conversion of the monomer mixture (i.e., beyond 100% conversion of fumarate ester monomers) and the copolymerization of the second sample to only about 59% conversion of the monomer mixture (i.e., about 65% conversion of the fumarate ester). The results are given in Table II. They show that the polymer formed at the end of the reaction is substantially higher in molecular weight than polymer formed during the copolymerization of the fumarate. This indicates that grafting and cross-linking reactions cause the molecular weight to increase after fumarate conversion is complete. This, in turn, causes the concentrate viscosity of the high conversion polymer to be extremely high, and its shear stability to be poor, relative to its molecular weight.

Table II

VINYL ACETATE/FUMARATE COPOLYMERS PREPARED WITH 1.34/1 MOLE RATIO OF VINYL ACETATE/FUMARATE SHOWING HIGH CONCENTRATE VISCOSITY AT HIGH CONVERSION AND LOW V.I. AND POLYMER MOLECULAR WEIGHT AT LOW CONVERSION

| Copolymer | Relative mol wt.[1] | Vis./210 (SUS) of 35% concentrate [2] | V.I. of 3.6% blend | Wt. percent of Monomers Converted to polymer [3] | Breakdown gear pump test [4] |
|---|---|---|---|---|---|
| Vinyl acetate-dialkyl* fumarate | 85.7 | 52,994 | 149 | 100 | 38.5 |
| Do | 62.4 | 1,180 | 141 | 59 | |

*Same as in Table I.
[1] See note Table I.
[2] See note Table I.
[3] Conversion of about 94% weight of the monomer mixture represents 99+% conversion of the fumarate.
[4] See note Table I.

To further illustrate the correlation of the concentrate viscosity with the dilute viscosity of fumarate/vinyl acetate copolymers in mineral oil when such polymers are prepared according to the process of this invention (i.e., when an excess of vinyl acetate is employed and high conversions of the monomer mixture are avoided), a number of $C_8$ to $C_{18}$ dialkyl fumarate esters having average molecular weights of about 380 were copolymerized with vinyl acetate according to the procedure of this invention. The relative molecular weight (SSU viscosity at 210° F. of a 3.6 weight percent blend of the copolymer in Mid-Continent mineral oil of 45.7 SUS viscosity at 210° F. and 113 V.I.) was plotted against the log 10 SSU viscosity at 210° of a 35 weight percent blend of copolymer in a 150 SSU viscosity at 210° F. and 108 V.I. mineral lubricating oil. FIGURE 1 represents the plot obtained and shows that there is definite correlation between the viscosity of dilute mineral oil blends and the viscosity of concentrated mineral oil blends of the copolymers. FIGURE 1 also shows that both the concentrate and dilute viscosity for mineral oil blends may be accurately predicted when the copolymer is prepared by the process of this invention.

FIGURE 2 represents the preparation of similar copolymers using instead approximately equal molar ratios of fumarate to acetate and copolymerizing to a high degree of conversion (i.e., about 94% conversion of the monomer mixture or about 99+% conversion of the fumarate ester). As shown by the plot of FIGURE 2, there is no correlation or predictability as regards the dilute and concentrate viscosities of mineral oil blends containing the copolymers prepared in this manner.

EXAMPLE II

To further illustrate the present invention, additional copolymeric additives were prepared both by the prior art processes and the improved process of this invention. Table III(a) illustrates the individual preparation of several vinyl acetate-dialkyl fumarate copolymers by the prior art process. Table III(b) illustrates the concentrate and dilute viscosity, viscosity index, and shear breakdown characteristics of a blend of the composite copolymeric additives obtained in runs 1 through 4 of Table III(a). Because the shear stability of the polymers prepared by this process were so poor, it was necessary to pass the polymer concentrates through a Manton-Gaulin Homogenizer to improve their shear stability. This is a further disadvantage of the polymers prepared by the prior process.

Table III(a)

PREPARATION OF COPOLYMER BY PRIOR ART PROCESS

Charge:
 Tallow fumarate _____ g-- 34
 $C_8$ oxo fumarate _____ g-- 120
 Vinyl acetate _____ g-- 46
Mole ratio vinyl acetate to fumarates _____ 1.31

| Run No. | 1 | 2 | 3 | 4 |
|---|---|---|---|---|
| Benzoyl peroxide, g | 3.2 | 3.2 | 3.0 | 3.2 |
| Hexane, ml. (added during polymerization) | 330 | 300 | 330 | 330 |
| Temperature, °C | 65-70 | 65-71 | 65-69 | 68-70 |
| Reaction time, hours | 30 | 29 | 13 | 18 |
| Fumarate conversion, percent | 99+ | 99+ | 99+ | 99+ |
| Rel. mol wt. of product [1] | 95.4 | 108.0 | 106.4 | 105.1 |

[1] See footnote (1) in Table I.

Table III(b)

COMPOSITE, APPROXIMATELY EQUAL AMOUNTS PRODUCT 1 THROUGH 4

| | 3.6 wt. percent polymer in mineral oil, 44.1 SUS vis. at 210°F., V.I. 113 | | | | 30% polymer, SUS/210°F. | Rel. shear breakdown, percent |
|---|---|---|---|---|---|---|
| | CS/100°F. | CS/210°F. | SUS/210°F.[1] | V.I. | | |
| Original | 100.6 | 20.19 | 99.3 | 149.2 | 10,300 | 62.2 |
| Homogenized [2] 1 pass/2000 lbs. | 90.6 | 17.04 | 86.1 | 148.4 | 4,640 | 51.5 |
| 2nd/2000 lbs | 88.5 | 16.44 | 83.7 | 148.1 | 4,470 | 49.0 |
| 3rd/3000 lbs | 82.7 | 14.80 | 77.2 | 146.7 | 3,520 | 42.0 |
| 4th/2000 lbs | | | 75.6 | | 3,500 | 40.0 |

[1] SUS/210°F. of 3.6 wt. percent polymer in said oil.
[2] In Manton-Gaulin homogenizer.

Table IV(a) shows a comparison of the prior art process and the process of this invention in the preparation of copolymeric additives. This table also shows the preparation of vinyl acetate-fumarate copolymers containing minor amounts of maleic anhydride as a third monomer. This copolymer of vinyl acetate/fumarate/maleic anhydride is of particular importance since in addition to its pour depressant—V.I. improving properties it also functions as a good motor oil detergent. Table IV(b) gives the properties of the copolymers prepared in Table IV(a).

Table IV(a)

Preparation of Copolymers [1]

| | Old process | Process of the invention | | | |
|---|---|---|---|---|---|
| Reference or run No. | Laboratory run 1,2,3 and 4 [2] | Pilot plant 5 | Pilot plant 6 | Pilot plant 7 | Laboratory 8 |
| Type | Acetate/fumarate | Acetate/fumarate | Acetate/fumarate | Acetate/fumarate/maleic anhydride | Acetate/fumarate/maleic anhydride |
| Charge: | | | | | |
| Tallow fumarate [3] | 34 g | 6.50 lbs | 6.05 lbs | 17.12 lbs | 58.0 g. |
| $C_{13}$ Oxo fumarate | 0 g | 0.00 | 0.00 | 0.00 | 75.5 g. |
| $C_8$ Oxo fumarate | 120 g | 17.20 lbs | 15.30 lbs | 22.88 lbs | 116.0 g. |
| Maleic anhydride | 0 | 0.00 | 0.00 | 1.56 lbs | 8.6 g. |
| Vinyl acetate | 46 | 11.10 | 13.62 | 23.25 | 145.0. |
| Mole ratio vinyl acetate to fumarates | 1.31 | 2.10 | 2.88 | 2.84 | 2.84. |
| Catalyst [4] | 3.2 g. $BzO_2$ | 0.15 lbs. $BzO_2$ | 0.085 lbs. $BzO_2$ | 0.35 lbs. TBP | 2.8 g. TBP. |
| Solvent | 300 ml. hexane [5] | 22.37 lbs. heptane.[5] | 7.04 lbs. Wryol E.[6] | 33.20 lbs. heptane.[5] | 50.0 g. heptane.[6] |
| Temperature, °C | 65-71 | 58-63 | 84-86 [7] | 80-85 [7] | 80-83.[7] |
| Reaction time, hours | 13 to 30 | 15 | 6.2 | 8 | 7.5. |
| Fumarate conversion, percent | 99+ | 99+ | 99+ | 99.5 | 99.5+. |
| Rel. mol. wt. of product [8] | 99.3 [9] | 128.8 | 90.9 | 76.8 | 77.4. |

[1] All contain fumarates and vinyl acetate.
[2] Composite of 4 runs, see Table III(a) for data on individual preparations.
[3] Mol. wt. 610.
[4] $BzO_2$=benzoyl peroxide. TBP=t-butyl perbenzoate.
[5] Solvent added during polymerization.
[6] Solvent added at start of polymerization. Wyrol E is a white mineral oil with a viscosity of 142 SUS at 100° F. and 42 SUS at 210° F.
[7] Reflux temperature.
[8] See note (1), Table I.
[9] Composite, see Table III.

Table IV(b)

Properties of Polymers [1]

| Reference or run No | Old process | Process of the invention | | | |
|---|---|---|---|---|---|
| | Laboratory run 1,2,3 and 4 [2] | Pilot plant 5 | Pilot plant 6 | Pilot plant 7 | Laboratory 8 |
| Type | Acetate/fumarate | Acetate/fumarate | Acetate/fumarate | Acetate/fumarate/maleic anhydride | Acetate/fumarate/maleic anhydride |
| Rel. mol. wt. of product [3] | 99.3 | 128.8 | 90.9 | 76.8 | 77.4. |
| Rel. shear breakdown* of product, percent [4] | 62.2 | | 39.0 | 39.5 | 39.3. |
| "Homogenization" [5] | 2/2 M + 1/3 M | 3/3 M | Not needed | Not needed | Not needed. |
| Rel. mol. wt. of "Homogenized" product | 75.6 | 93.2 | | | |
| Rel. shear breakdown, percent* ("Homogenized" product) | 40.0 | 39.5 | | | |
| Wt. percent polymer in standard additive [6] | 39.6 [7] | 31.0 [7] | 31.6 [7] | 38.8 | 38.3. |
| Viscosity of 30% polymer in mineral oil of 150, SUS vis. at 210° F | 3,500 | 7,450 | 4,500 | 5,200 | 7,000. |
| V.I. potency, ceiling in mineral oil of footnote 6 | 147 | 147 | 148 | 150 | 149. |

*Shear breakdown by ultrasonic equipment under conditions to give results correlating with gear pump breakdown test.
[1] Preparation described in Table IV(a).
[2] Composite of 4 runs, see Table III (a) and (b).
[3] See note ([1]) Table I.
[4] Target value for standard additive is 40% maximum breakdown.
[5] "Homogenization" by passage through a Manton-Gaulin homogenizer. 2/2M=2 passes at 2,000 lbs. pressure, etc.
[6] Standard additive thickens mineral oil of 45.7 SUS vis. @ 210° F. and 113 V.I. to 81 SUS vis. at 210° F. with 10 wt. percent additive, and has a relative shear breakdown of 40%. (Equivalent to acryloid 763.)
[7] Note that less new process polymer is required to do the same degree of thickening.

Tables IV(a) and (b) show that, by the improved process of this invention, copolymeric additives of good shear breakdown can be prepared without homogenization. These two tables also show that less of the copolymers prepared by the improved process are required to obtain the same degree of thickening in the lubricating oil base. This latter improvement is brought out by a comparison of the wt. percent polymer in standard additive of runs 5 and 6 with that obtained for the composite of runs 1 through 4.

In summary, Examples I and II disclose the following important advantages for the improved process of this invention: (1) Improved and reproducible concentrate viscosities making for good control over final blending and giving a product more readily handled (of suitable viscosity), (2) preparation of a polymer of good shear breakdown without homogenization, and (3) savings in polymer in final lubricating oil blend.

What is claimed is:

1. In a process for preparing oil-soluble copolymeric additives from a monomer mixture comprising at least a major proportion of vinyl ester and dialkyl fumarates, the improvement which comprises, mixing 1.5 to 5 molar proportions of said vinyl ester per molar proportion of said fumarate, copolymerizing said vinyl ester and said dialkyl fumarate until about 96 to about 99.9% of the fumarate monomer has been polymerized, then terminating said copolymerization reaction, and removing unreacted vinyl ester.

2. The process according to claim 1, wherein about 1 to 5 percent by weight, based on the total weight of said monomer mixture, of maleic anhydride is added to said mixture of vinyl ester and dialkyl fumarate prior to said copolymerization.

3. The improvement according to claim 1 wherein 2 to 5 molar proportions of said vinyl ester are employed per molar proportion of said fumarate.

4. The improvement according to claim 1 wherein said vinyl ester is the vinyl ester of a fatty acid having from 2 to 18 carbon atoms and said dialkyl fumarate has an average of 8 to 18 carbon atoms per alkyl group.

5. An improved process for preparing an oil-soluble copolymer of a vinyl ester of a fatty acid having from 2 to 18 carbon atoms and a dialkyl fumarate having an average of 8 to 18 carbon atoms per alkyl group, wherein 1.5 to 5 molar proportions of said vinyl ester are mixed with one molar proportion of said fumarate, then copolymerized at temperatures in the range of 50 to 125° C. until 96 to 99.9% by weight of the fumarate has been copolymerized, then terminating said copolymerization and removing unreacted vinyl ester.

6. An improved process for preparing an oil-soluble copolymer from a mixture of vinyl ester, dialkyl fumarate and maleic anhydride, said vinyl ester being the ester of a fatty acid having from 2 to 18 carbon atoms, said dialkyl fumarate having an average of 8 to 18 carbon atoms per alkyl group and said maleic anhydride being present in an amount ranging from about 1 to 5 percent by weight of the total reactants, said process comprising mixing 1.5 to 5 molar proportions of said vinyl ester per molar proportion of said fumarate, copolymerizing at temperatures in the range of 50 to 125° C. until 96 to 99.9 percent by weight of the fumarate has been copolymerized, terminating said copolymerization and removing unreacted vinyl ester.

References Cited in the file of this patent

UNITED STATES PATENTS

| 2,721,879 | Popkin et al. | Oct. 25, 1955 |
| 2,825,717 | Cashman et al. | Mar. 4, 1958 |